United States Patent [19]  
Davis

[11] Patent Number: 4,497,396  
[45] Date of Patent: Feb. 5, 1985

[54] VARIABLE MECHANICAL ADVANTAGE SHIFT LEVER

[75] Inventor: Alan R. Davis, Plainwell, Mich.

[73] Assignee: Eaton Corporation, Cleveland, Ohio

[21] Appl. No.: 419,851

[22] Filed: Sep. 20, 1982

[51] Int. Cl.³ ..................... F16D 23/06; G05G 9/12; G05G 7/04
[52] U.S. Cl. ................... 192/53 E; 74/470; 74/473 R; 74/517; 192/99 S; 192/109 A
[58] Field of Search ............ 74/470, 473 R, 516, 74/517; 192/53 E, 53 F, 99 S, 109 A

[56] References Cited

U.S. PATENT DOCUMENTS

| 1,427,684 | 8/1922 | Grieves | 74/470 |
| 1,696,178 | 12/1928 | Ahlm | 74/470 X |
| 3,221,851 | 12/1965 | Vandervoort | 192/53 |
| 3,276,285 | 10/1966 | Irgens | 74/470 |
| 3,387,501 | 6/1968 | Frost | 74/335 |
| 3,799,002 | 3/1974 | Richards | 74/745 |
| 3,850,047 | 11/1974 | Davis | 74/473 P |
| 3,878,926 | 4/1975 | Adachi | 74/470 X |
| 4,022,077 | 5/1977 | Brewer et al. | 74/473 R |
| 4,170,149 | 10/1979 | Koegel | 74/470 X |
| 4,450,867 | 5/1984 | Moore | 74/517 |

FOREIGN PATENT DOCUMENTS 434268 11/1911 France ................... 74/470

Primary Examiner—Allan D. Hermann  
Attorney, Agent, or Firm—C. H. Grace; H. D. Gordon

[57] ABSTRACT

A variable mechanical advantage/effective length shift lever assembly (12) of the first class lever type for a synchronized transmission (10) is provided. The shift lever assembly comprises a relatively solid section (56 and 68) and a resiliently deflectable section (70). The shift lever assembly (12) defines a second portion (62) having a first effective length (72) when the deflectable section (70) is in the nondeflected position thereof and a second shorter effective length (80) upon deflection of the resiliently deflectable section (70).

17 Claims, 8 Drawing Figures

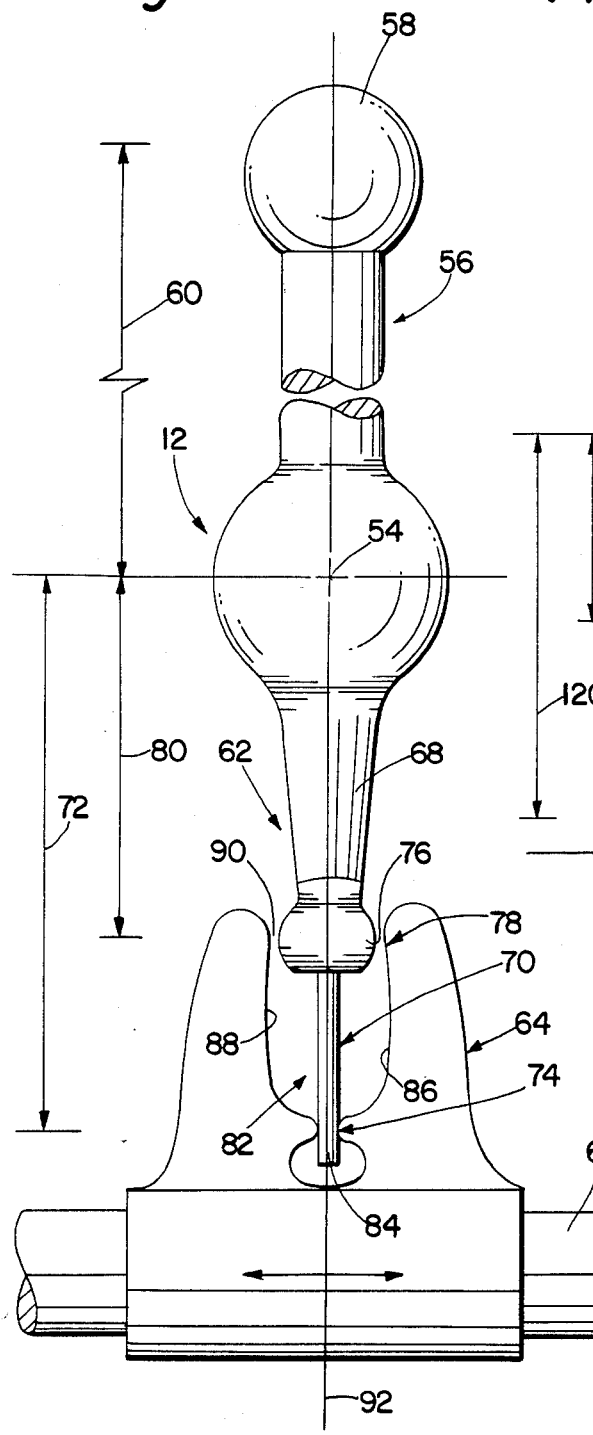
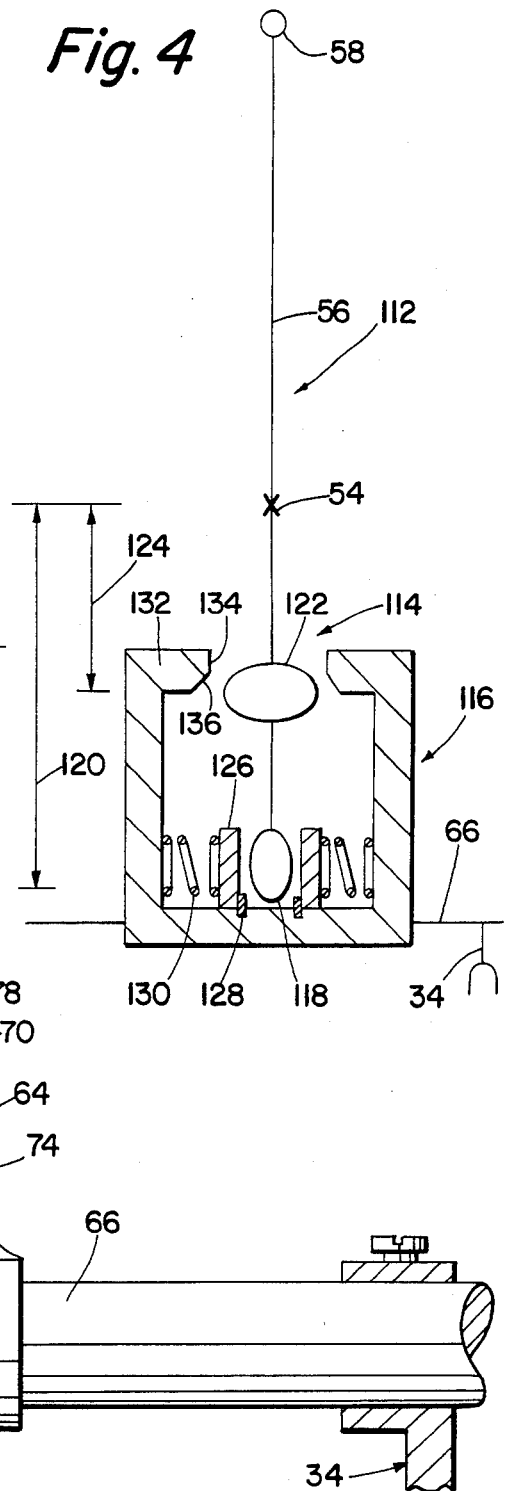

VARIABLE MECHANICAL ADVANTAGE SHIFT LEVER

BACKGROUND OF THE INVENTION

1. Field of the Invention

The present invention relates to variable mechanical advantage first class levers, such as shift levers, and in particular to variable mechanical advantage shift levers for selectively shifting synchronized positive clutch type mechanical change gear transmissions.

2. Description of the Prior Art

Shift levers for shifting sliding clutches and/or sliding gears into and out of driving engagement are well know in the prior art. Shift levers for shifting mechanical transmisons are well known in the prior art, as may be seen by reference to U.S. Pat. Nos. 4,259,877; 3,915,027 and 3,850,047, all of which are hereby incorporated by reference. Typically, such shift levers are first class levers pivotably mounted in a tower assembly and include a first end portion usually gripped and pivotably moved by a driver/operator and a second end portion extending into and cooperating with a shift bar housing assembly having a plurality of axially movable shift rails each carrying a shift fork and a shift block member thereon. Typically, the shift lever is pivoted in one direction to engage the second portion thereof with the shift block member carried by a selected shift rail and is then pivoted in a transverse direction to axially move the shift rail and shift fork carried thereby.

Shift levers of this type are first class levers defined by a first portion usually gripped by the operator, a second portion usually engageable with one or more shift rails and a pivot point located between the first and second portions. As is known, if the first portion is of a fixed length, the mechanical advantage of the shift lever will vary inversely with the effective length of the second portion and the required travel of the first portion to achieve a given axially movement of a shift rail will vary directly with the effective length of the second portion. In prior art shift levers of this type, the effective length of the second portion is usually fixed and is a compromise between desired mechanical advantage and a desire to minimize the required pivotal movement of the first portion to achieve a given movement of the engaged shift rail. Shift levers of this type may be seen by reference to U.S. Pat. No. 3,934,485, hereby incorporated by reference.

Synchronized mechanical transmissions are well known in the prior art and may be seen by reference to U.S. Pat. Nos. 4,307,624; 3,929,029 and 3,221,851, all hereby incorporated by reference. Typically, such transmissions comprise constantly meshed gears on parallel shafts with synchronized positive clutches to selectively clutch a selected one of the gears for rotation with one of the shafts. Such synchronized positive clutches typically comprise an axially fixed positive clutch member (usually fixed to a gear) and an axially slideable positive clutch member (usually splined to a shaft for rotation therewith and axial movement relative thereto) movable towards and away from the fixed clutch member. The axially slideable positive clutch member is axially mounted on the shaft and movable toward and away from the fixed positive clutch member by a shift fork or the like. A blocking mechanism is provided interposed the two positive clutch members to prevent engagement of the positive clutch members if they are not rotating at a synchronous or substantially synchronous speed. A relatively high torque capacity friction synchronizer clutch is provided for causing the two positive clutch members to rotate at a synchronous speed, such friction synchronizer clutch being applied by the axially movable positive clutch member usually through the blocker means. When the positive clutch members are caused to rotate at a substantially synchronous speed, the blocker mechanism will '37 unblock" allowing the axially movable positive clutch member to move axially therethrough and into positive engagement with the axially fixed positive clutch member. In transmissions carrying relatively large torque loads, such as mechanical change gear transmissions for heavy duty trucks, the axial force required to properly engage the frictional synchronizing clutches is considerable.

The axial movement of the axially movable positive clutch member from a fully disengaged to a fully engaged position may be separated into three distinct segments. The first segment is an initial movement of the axially movable positive clutch member into engagement with the blocker and initial engagement of the frictional synchronizing clutch. This first segment of axial movement typically requires a relatively small axial movement and a relatively low axial force. The second segment is axial movement to fully frictionally engage the synchronizer clutch sufficiently to cause synchronization of the positive clutch members. This second segment of clutch movement requires very little axial movement (compression of the friction surfaces) and a relatively high axial force. The third segment is a final clutch movement after synchronization is achieved and the unblocking means has unblocked wherein the axially movable clutch member moves through the blocker and into engagement with the other positive clutch member. This final segment of axial movement typically requires a relatively low axial force and a relatively large axial travel.

The prior art shift levers for synchronized mechanical transmissions for heavy duty vehicles were not totally satisfactory as if the second lever portion was of a short enough effective length to provide a satisfactory mechanical advantage, the required travel of the first portion was larger than desired and often objectionable, especially in the cab of a heavy duty truck where space is often very limited and if the second portion was of a large enough effective length to provide an acceptable travel of the first portion the mechanical advantage thereof was reduced requiring an often objectionable amount of driver effort to engage the frictional synchronizing clutches.

SUMMARY OF THE INVENTION

In accordance with the present invention, the drawbacks of the prior art have been overcome or minimized by the provision of a variable mechanical advantage shift lever having a first portion for gripping by the driver, a second portion for applying an axial force to a shift rail and a fixed pivot point therebetween. The second portion includes a solid segment, rigid with the first portion, from which a resilient segment extends. The resilient segment engages the member to be axially moved at a first displacement from the pivot point to define a first effective lever length and is resiliently deflectable under a predetermined resistance to axial movement to allow the solid segment portion to engage the member to be axially moved at a second, shorter displacement from the pivot point to define a second, shorter effective lever length. The resistance to deflection of the resilient segment is sufficient to axially move the shift rail in the initial and the final segments of axial movement of a typical synchronized positive clutch transmission, but sufficient to fully engage the frictional synchronizer clutches, providing the operator with a relatively low mechanical advantage, relatively low required pivotal movement lever during these segments of operation. When the solid segment engages the member to be moved as a result of deflection of the resilient segment during application of the frictional synchronizer cluthces, the second lever portion has the second effect length and thus provides the driver with a relatively high mechanical advantage high pivotal movement lever.

In an alternate embodiment, the entire second portion is rigid and the shift block includes resilient means to engage the second portion at the longer effective lever length thereof.

Accordingly, it is an object of the present invention to provide a new and improved shift lever.

Another object of the present invention is to provide a new and improved shift lever of variable mechanical advantage for a change speed transmission, preferably of the positive synchronized clutch type.

These and other objects and advantages of the present invention will become apparent from a reading of the description of the preferrred embodiment taken in view of the attached drawings.

BRIEF DESCRIPTION OF THE DRAWINGS

FIG. 2 is a partial cross sectional view of the variable mechanical advantage shift lever assembly of the present invention.

FIG. 4 is a schematic illustration of an alternate embodiment of the present invention.

DESCRIPTION OF THE PREFERRED EMBODIMENT

Figure 1:
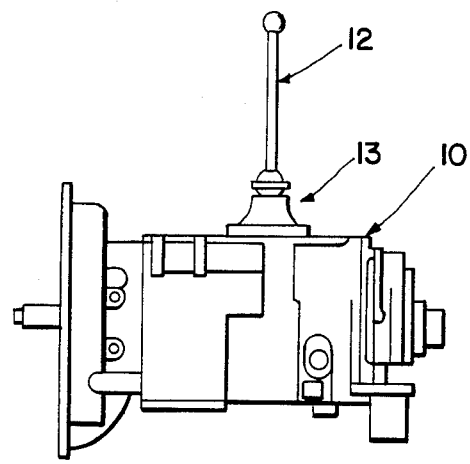
FIG. 1 is an elevational view of a transmission assembly including the variable mechanical advantage shift lever of the present invention.

In this disclosure, certain terminology will be used for convenience in reference only and will not be limiting. For example, the terms "forward" and "rearward" will refer to directions forward and rearward of the vehicle in which the transmission is installed. The terms "rightward" and "leftward" will refer to directions as taken in the drawings in connection with which the terminology is used. The terms "inward" and "outward" will refer to directions toward and away from, respectively, the geometric center of the apparatus. The foregoing applies to normal derivities of the above mentioned terms and terms of similar import.

Referring now to FIG. 1 which shows the environment of the present invention and includes a typical change gear heavy duty truck transmission 10, preferably of the synchronized type utilizing synchronized positive cluthes, as a matter of example, rather than limitation, which is shifted over a variable speed range by means of a gear shift lever 12. Transmission 10 may be of any one of a plurality of well known simple or compound transmission structures and the specific structure of transmission 10 forms no part of the present invention.

Figure 1A:
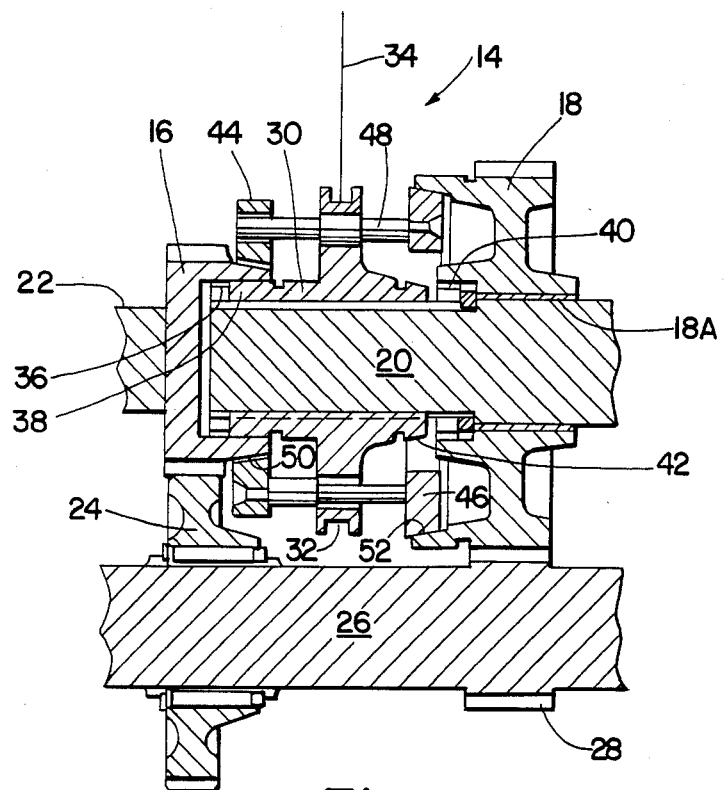
FIG. 1A is a partial sectional view of a gear group including a typical synchronized positive clutch assembly.

FIG. 1A illustrates a typical synchronized positive clutch assembly 14 for selectively engaging one of two selectable gears 16 or 18 to a driven shaft 20. The specific structure of the gearing and of the clutch assembly 14 is shown for illustrative purposes only and is not intended to be limiting. Briefly, gear 16 is fixed for rotation with a shaft 22 which may be the input shaft of a transmission or a transmission section. Gear 16 is constantly meshed with a countershaft gear 24 which is fixed for rotation on a countershaft 26 which additionally carries a gear 28 fixed for rotation therewith. Gear 28 is in constant meshing engagement with gear 18. Gear 18 is provided with an annular bushing 18A allowing gear 18 to rotate relative to shaft 20 when not positively clutched thereto.

Synchronized positive clutch assembly 14 may be shifted rightwardly to engage gear 18 with shaft 20 or may be shifted leftwardly to engage gear 16 with shaft 20. Synchronized positive clutch assembly 14 includes a double ended axially movable clutch member 30 which is splined to shaft 20 for axial movement relative thereto and rotation therewith. Clutch member 30 is provided with a generally annular groove 32 for receipt of a shift fork 34 as is well known in the art. Gear 16 is provided with internal positive clutch teeth 36 for engagement with external clutch teeth 38 on the leftward end of clutch member 30 and gear 18 is provided with internal clutch teeth 40 for engagement with external clutch teeth 42 carried by the rightward end of clutch member 30. Conical friction clutch members 34 and 46 are carried on the leftward and rightward, respectively, ends of synchronizer pins 48 for frictional synchronizing engagement with conical friction surfaces 50 and 52 carried by gears 16 and 18 respectively. As is well known in the art of synchronized transmissions, initial axial movement of clutch 30 from the disengaged position shown will result in the synchronizer pins 48 preventing further axial movement if the positive clutch members are not at synchronous or substantially synchronous rotation and will cause the friction surfaces to engage. With sufficient axial force on the friction surfaces, the shaft 20, and clutch member 30 which rotates therewith, will be caused to rotate at a synchronous or substantially synchronous speed with the selected gear and positive clutch teeth carried thereby. Upon achievement of a substantially synchronous rotation of the clutch members, the blocker pins 48 will cease to prevent further axial movement of clutch member 30 and the clutch member 30 will move through the block into engagement with the selected gear.

The initial movement of the clutch member 30 to cause the blocker to engage and to result in initial contact of the friction surfaces requires a relatively small axial movement and a relatively small axial force. The axial force required to engage the friction members to bring the positive clutch members into synchronous or substantially synchronous rotation requires a relatively small axial movement but a relatively large axial force. Upon achievement of synchronous rotation of the positive clutch members and subsequent unblocking of the blocker, further axial movement of the axially movable clutch member 30 through the blocker and into positive engagement with the selected positive clutch member requires a relatively large axial movement with a relatively small axial force. The above described operation of a synchronized positive clutch assembly is well known in the prior art as are various modifications thereof and a specific structure of the synchronizer clutch assembly forms no part of the present invention.

The structure and operation of shift lever assembly 12 may be seen in greater detail by reference to FIG. 2. Shift lever 12 is a first class lever mounted to transmission 10 in a well known tower assembly 13 and is mounted to the housing of transmission 10 for pivotal movement about a pivot point 54. The specific structural mounting of lever 12 to housing 10 for pivotal movement about point 54 may be of any well known construction, one example of which may be sen by reference to above mentioned U.S. Pat. No. 3,850,047, and forms no part of the present invention. Shift lever 12 consists of a first lever portion 56 extending upwardly from the pivot point 54 to a handle or knob portion 58 intended for gripping by a vehicle operator or the like. First portion 56 of lever 12 has an effective lever length 60 measured from the pivot point 54. A second variable mechanical advantage/variable effective length lever portion 62 extends downwardly from the pivot point 54 for engagement with a shift block member 64 which is axially fixed to a shift rail 66 axially movable in a shift rail housing assembly (not shown) and carrying shift fork 34 for axial movement therewith. The specific structure of the shift rail housing assembly and the axial mounting of shift rail 66 therein may be of any well known construction and forms no part of the present invention.

The variable mechanical advantage/variable effective length second portion 62 of shift lever 12 consists of a relatively solid segment 68 and a resiliently deflectable segment 70 extending downwardly from solid segment 68. Preferably, relatively solid segment 68 is an integral extension of first lever portion 56. Portion 56 and solid segment 68 of portion 62 are rigidly attached and in combination define a relatively solid section of lever 12. Relatively deflectable segment 70 is received within shift block member 64 for axial movement therewith and in combination with relatively solid segment 68 defines a first effective lever length 72 from the point of contact 74 with shift block member 64 to the pivot point 12 for the second portion 62. Resilient portion 70 is resiliently deflectable allowing the bulbulous end 76 of relatively solid segment 68 to axially engage the shift block member 64 at a contact point 78 to define a second effective lever length 80 for the second shift lever portion 62 measured from the pivot point 12.

The shift block 64 defines a contoured slot 82 in which bulbulous end 76 of relatively solid segment 68 and remote end 84 of relatively deflectable segment 70 of the second lever portion 62 may be received. As is known, for shift bar housing assemblies having a plurality of shift rails, ends 76 and 84 of segments 68 and 70, respectively, may be moved into and out of axial alignment with the shift block 64 by pivotal movement of lever 12 in a plane normal to the axis of shift rail 66. Slot 82 of shift block 64 is defined by a rightward end wall 86 and a leftward end wall 88. As is known, engagement of end wall 86 by lever portion 62 will cause a rightward axial movement of shift rail 66 and engagement of end wall 88 by shift lever portion 62 will result in a leftward axial movement of shift rail 66. End walls 86 and 88 both extend inwardly at contact point 74 to maintain the end walls in substantially constant engagement with the relatively resilient segment 70 of second lever portion 62. In the nondeformed or nondeflected position of resilient segment 70, a clearance 90 is maintained between the bulbulous end 76 of relatively solid segment 68 and the end walls 86 and 88. The magnitude of axial clearance 90 is sufficient to prevent engagement of bulbulous portion 76 with the trailing end wall 86 or 88 during the total axial movement of shift rail 66 in either the rightwardly or leftwardly direction.

Briefly, resilient segment 70 may be in the form of a leaf spring received in and extending downwardly from the bulbulous portion 76 of relatively solid segment 68 and is of a material and configuration sufficient to resist deflections thereof about a common axis 92 with the relatively solid segment 68 when axially moving shift rail 66 provided the resistance to axial movement of shift rail 66 is less than a predetermined value. Typically, the resiliently deflectable segment 70 is selected so that it will not deflect about axis 92 unless the force required to axially move shift rail 66 exceeds that force normally expected during the first and third segments of axial movement of typical synchronized positive clutch assembly 14 but will resiliently deflect allowing bulbulous portion 76 to engage sidewall 86 or 88 at the force level required during the second segment of axial movement of shift rail 66 required to fully frictionally engage the frictional synchronizer clutches.

Of course, other attachments of resilient segment 70 to relatively solid segment 68 are possible, such as a torsional spring or the like, and such alternate attachments are contemplated within the scope of the present invention. Also, segment 70 could be relatively rigid with a resilient connection, such as a torsional spring interposed segments 68 and 70 of second lever portion 62.

Figure 3A:
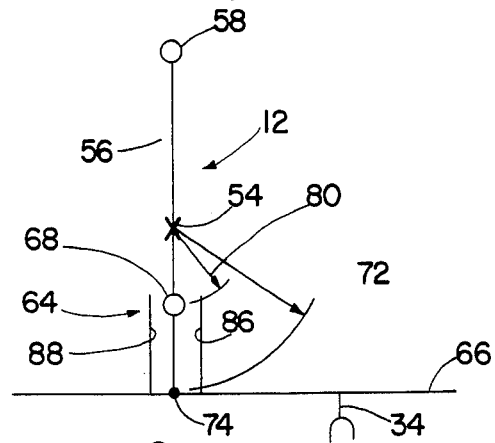
FIGS. 3A–D are schematic illustrations of the operation of the shift lever assembly of the present invention.
Figure 3B:
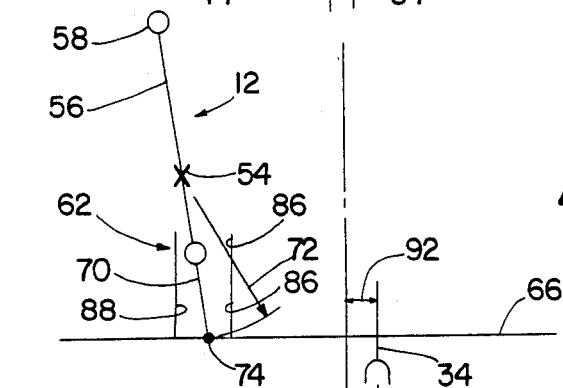

The operation of variable mechanical advantage shift lever assembly 12 of the present invention is schematically illustrated in FIGS. 3A-3D. In FIG. 3A, the shift lever assembly 12 is illustrated in the neutral position whereat shift fork 34 and shift member 30 is axially centered relative to clutch teeth 38 and 40. Assuming it is desired to clutch gear 18 to shaft 20, knob 58 of first lever portion 56 is pivoted in a generally leftward direction to move shift rail 66 and shift fork 34 attached thereto in a generally rightward direction. The first segment of axial movement of shift fork 34 is illustrated in FIG. 3B and comprises an axial movement 92 of shift fork 34 from the neutral position illusrated in FIG. 3A. During this initial segment of axial movement, the resistance to axial movement of shift rail 66 is less than that required to cause a resilient deflection of resilient segment 70 and thus the second portion 62 of shift lever assembly 12 operates at its first effective length 72. Axial displacement 92 is sufficient to cause the blocker to engage and to cause initial engagement of frictional surfaces 48 and 52.

Figure 3C:
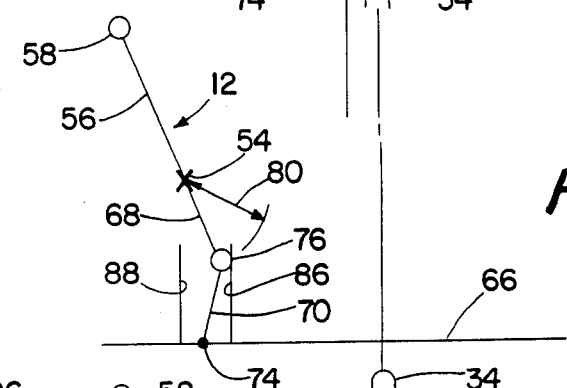

The second segment of axial movement of shift fork 34 and shift rail 66 is illustrated in FIG. 3C and comprises a very small movement of the shift fork 34 axially rightwardly to apply a relatively high axial force to the synchronizer clutch friction surfaces to cause the positive clutch members 40 and 42 to rotate at a substantially synchronous speed. As the force required to apply a frictional synchronizing clutch is greater than that required to cause a deflection of relatively resilient segment 70, resilient segment 70 will deflect sufficiently to cause bulbulous portion 76 of relatively solid portion 68 to engage sidewall 86 and thus the second lever portion 62 will operate at the second, shorter effective lever length 80. As is seen by reference to FIG. 3C deflecting relatively resilient portion 70 and applying a rightward axial force to the shift block 64 requires a relatively significant pivotal movement of knob 58 in the leftward direction. As is also seen, the second segment of axial movement of shift fork 34 is relatively insignificant.

Figure 3D:
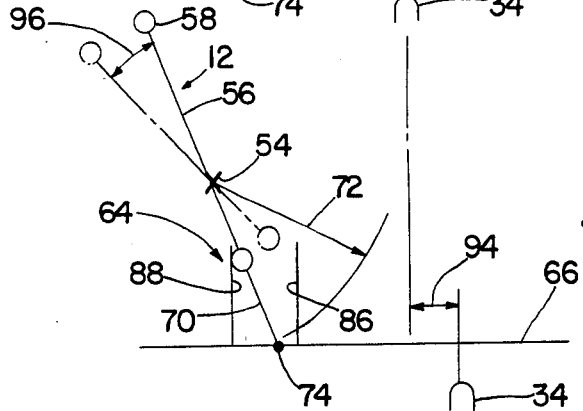

Upon achievement of substantially synchronous rotation of the positive clutch members 40 and 42, the blocker will unblock and the shift fork 34 will move a further axial distance 94 from the positions illustrated in FIGS. 3B and 3C to the axial position illustrated in FIG. 3D. As the force required for this third segment of axial movement of shift fork 34 and shift rail 66 is less than that required to maintain resilient segment 70 in the deflected position thereof, the resilient portion 70 will return to the nondeflected position allowing the second portion 62 of the lever to operate at the first relatively longer effective lever length 72. As is seen, axial movement 94 will thus require little or no additional leftward pivotal movement of knob 58. The lever illustrated in dotted lines in FIG. 3D illustrates the amount of pivotal leftward movement of knob 58 which would be required if a second lever portion having a fixed effective length 80 were utilized to gain the mechanical advantage obtained by lever assembly 12 of the present invention during the second segment of axial movement as is seen in FIG. 3C. As is seen by reference to the dotted line illustration, the amount 96 of pivotal movement not required as a result of utilizing the present lever assembly 12 is substantial.

An alternate embodiment 112 of the present invention is schematically illustrated in FIG. 4. Shift lever 112 is a relatively solid, rigid first class lever mounted to transmission 12 about a fixed pivot point 54. Lever 112 comprises a first portion 56 extending upwardly from the pivot point 54 to a knob 58 and a second variable mechanical advantage/variable effective length second portion 114 extending downwardly from the pivot point for engagement with shift block 116 mounted to shift rail 66 carrying shift fork 34.

The second portion 114 includes a first contact member 118 for resiliently engaging the shift block at a first effective lever length 120 from the pivot point and a second contact member 122 for engaging the shift block at a second, shorter effective lever length 124 upon sufficient resilient axial movement of contact point 118 relative to the shift block.

Contact member 118 contacts resilient plates 126 which are urged axially inwardly against stops 128 by springs 130. The force required to deflect plates 126 axially outwardly is greater than that required to axially move shift rail 66 during the first and third segments of axial movement of clutch member 30 but less than the axial force required to fully engage the frictional synchronizer clutches.

Shift block 116 is further defined by axially inwardly extending walls or projections 132 defining a contact surface 134 and a relief surface 136. Contact member 122 is generally axially outwardly extending and will contact the contact surface 134 of the leading projection 132 and will clear the trailing projection 132 at relief 136 upon resilient axial outward deflection of the leading plate 126.

The operation and function of embodiment 112 is substantially identical to that of embodiment 12 described above.

Accordingly, it may be seen that the present invention provides an improved shift lever assembly having a variable mechanical advantage/variable effective length second lever portion which provides the advantages of a relatively shorter effective length second lever portion for increased mechanical advantage during the segment of the shift operation requiring exertion of a substantial axial force, namely that segment during which the synchronizing clutches are being engaged and also provides the advantage of a relatively longer second lever portion for final axial movement of the shift rail and shift fork to the fully engaged position of the selected positive clutch.

Although a particular preferred and alternate embodiment of the invention has been disclosed above for illustrative purposes, it will be understood that variations or modifications thereof which lie within the scope of the below claims are fully contemplated.

I claim:

1. In combination a lever and a member to be selectively moved substantially axially against a resistance, said combination comprising:
   a first class lever having a first fixed length lever portion extending from a selectively moved end to a substantially fixed pivot point and a second variable effective length lever portion engagable with said member to be axially moved, said second lever portion engagable with said member to be moved at a first and at a second contact point, said first point more distant from said pivot point than said second point, and
   resiliently deflectable means associated with one of said second lever portion and said member to be axially moved for causing said second lever portion to resiliently engage said member to be moved at said first point and preventing said second lever portion from engaging said member to be moved at said second point when said resistance to said axial movement is less than a predetermined value, said resilient means resiliently deflectable to allow said second lever portion to solidly contact said member to be moved at said second point when said resistance to axial movement is at least equal to said predetermined value.

2. The combination of claim 1 wherein said second lever portion comprises a first substantially rigid segment extending from said pivot point to said second point and a second resiliently deflectable segment extending from said second point to said first point.

3. The combination of claim 1 wherein said second lever portion is substantially rigid and said member to be axially moved includes at least one resiliently axially deflectable surface for engagement by said first point.

4. A lever assembly of the first class lever type for selectively axially moving an axially movable member against a resistance, said lever assembly comprising;
   a relatively rigid portion having a first end adapted for manual engagement and a second end, said relatively rigid portion pivotably mounted at a fixed location intermediate said first and second ends;
   a relatively resiliently deflectable portion extending from said second end away from said pivot point, said relatively deflectable portion engageable with said member to be axially moved at a first engagement point more axially spaced from said pivot point then said second end to define a first effective lever length measured from said first engagement point to said pivot point, said relatively deflectable member resiliently deflectable under a resistance to axial movement of said member to be axially moved exceeding a predetermined limit sufficient to cause said second end to engage said member to be axially moved at a second engagement point more closely spaced from said pivot point then said first engagement point to define a shorter effective lever length measured from said second engagement point to said pivot point.

5. The lever assembly of claim 4 wherein said resilient portion comprises a resilient leaf spring generally axially aligned with said relatively rigid portion.

6. The lever assembly of claim 5 wherein said member to be axially moved defines a generally "U" shaped slot defined by a bottom wall in two substantially parallel walls, said relatively resilient portion engageable with said member to be moved adjacent said bottom wall and said second end engageable with said member to be moved on one of said side walls.

7. The lever assembly of claim 4 wherein said lever contacts said member to be moved at only said first engagement point in the nondeflected position of said resiliently deflectable portion.

8. The lever assembly of claim 4 wherein said second end comprises a generally bulbulous shape.

9. A lever assembly of the first class lever type for applying a substantially axial force to a member to be axially moved against a resistance, said assembly comprising;
 a substantially rigid section having a first end adapted for selective movement and a second end, said rigid section pivotably mounted at a fixed pivot point intermediate said first and second rigid section ends, said first rigid section end spaced from said pivot point by a first distance defining a first lever portion having a fixed lever length;
 a relatively resiliently deflectable section extending from said second rigid section end away from said pivot point, said resiliently deflectable section in the nondeflected position thereof effective to prevent engagement of said rigid section second end and said member and engageable with said member to be axially moved at a first contact point more distant from said pivot point than said rigid portion second end to define a second lever portion having a first effective lever length measured from said pivot point, said resiliently deflectable portion resiliently deflectable to allow said second rigid section end to engage said member to be moved at a second contact point closer to said pivot point than said first contact point to define a second lever portion having a second effective lever length shorter than said first effective lever length.

10. The lever assembly of claim 9 wherein said resiliently deflectable section comprises a resilient member rigidly joined to and extending from said second rigid section and.

11. The lever assembly of claim 10 wherein said resiliently deflectable section is generally coaxial with the portion of said rigid section extending from said pivot point to said second end, and said member to be moved includes a slot defined by side walls and a bottom wall, said first contact point being located adjacent to said bottom wall intermediate to said side walls, said second contact point located on one of said side walls, said resilient portion substantially constantly engaged with said first contact point.

12. A shift lever assembly of the first class lever type for axially moving a shift rail of a synchronized positive clutch transmission of the type comprising synchronized positive clutches wherein the axial movement of said synchronized positive clutches from a fully disengaged axial position to a fully engaged axial position comprises a first segment of axial movement wherein the axially movable positive clutch member is moved into engagement with the blocking means and the frictional synchronizing clutches are initially engaged, a second segment of axial movement wherein the frictional synchronizing clutches are fully engaged to bring the positive clutch members into substantially synchronous rotation and a third segment of axial movement occurring after substantial synchronization of the positive clutch members wherein the axially movable clutch member moves past the blocking means into positive engagement with the other positive clutch member, said second segment of positive clutch member axial movement requiring a substantially higher axial force than is required during said first and third segments of axial movement of said positive clutch member, said assembly comprising;
 a substantially rigid section having a first end adapted for selective pivotal movement and a second end, said rigid section pivotably mounted at a fixed pivot point intermediate said first and second rigid section ends, said first rigid section end spaced from said pivot point by a fixed distance defining a first lever portion having a fixed lever length;
 a relatively resiliently deflectable section extending from said second rigid second end away from said pivot point, said resiliently deflectable section in the nondeflected position thereof engageable with a shift block member on said shift rail at a first contact point more distant from said pivot point than said rigid portion second end to define a second lever portion having a first effective lever length measured from said pivot point, said resiliently deflectable portion in the nondeflected position thereof preventing engagement of said shift block member with said rigid section second end, said resiliently deflectable portion resiliently deflectable to allow said rigid section second end to engage said shift block member at a second contact point closer to said pivot point than said first contact point to define a second lever portion having a second effective lever length shorter than said first effective lever length.

13. The shift lever assembly of claim 12 wherein the resistance to axial movement of said shift block member during said first and third segments of axial movement thereof are insufficient to cause deflection of said resiliently deflectable member sufficient to cause said rigid section second end to contact said shift block member at said second contact point and the force required to fully engage said frictional synchronizing clutches during said second segment of axial movement of said shift block member is sufficient to cause deflection of said resiliently deflectable member sufficiently to allow said rigid section second end to contact said shift block member at said second contact point.

14. The shift lever assembly of claim 13 wherein said resiliently deflectable section is generally coaxial with the portion of said rigid section extending from pivot point to said second end, said shift block member define a generally "U" shaped cavity defined by a pair of generally parallel side walls and a bottom wall, said first contact point located adjacent said bottom wall intermediate said side walls and said second contact point located on one of said side walls, said resilient section substantially constantly engaged with said first contact point.

15. The shift lever assembly of claims 13 or 14 wherein said rigid section second end is of a generally bulbulous shape and said resilient portion extends therefrom.

16. The shift lever assembly of claims 14 or 15 wherein said side walls are contoured so that said second end will not contact said side walls during axial movement of said shift block member from the fully disengaged to the fully engaged positions thereof when said resiliently deflectable member is in the fully nondeflected position thereof.

17. A shift lever system of the first class lever type for axially moving a shift rail of a synchronized positive clutch transmission of the type comprising synchronized positive clutch assemblies wherein the axial movement of said synchronzied positive clutches from a fully disengaged axial position to a fully engaged axial position to a fully engaged axial position comprises a first segment of axial movement wherein the axially movable positive clutch member is moved into engagement with the blocking means and the frictional synchronizing clutches are initially engaged, a second segment of axial movement wherein the frictional synchronizing clutches are fully engaged to bring the positive clutch members into substantially synchronous rotation and a third segment of axial movement occurring after substantial synchronization of the positive clutch members wherein the axially movable clutch member moved past the blocking means into positive engagement with the other positive clutch member, said second segment of positive clutch axial movement requiring a substantially higher axial force than required during said first and third segments of axial movement of said positive clutch member, said system comprising;

a first class lever having a first fixed length lever portion extending from a selectively moved end to a substantially fixed pivot point and a second variable effective length lever portion engagable with a shift block member on said shift rail, said second lever portion engagable with said shift block member at a first and at a second contact point, said first point more distant from said pivot point than said second point, and resiliently deflectable means associated with one of said second lever portion and said shift block member for causing said second lever portion to resiliently engage said shift block member at said first point and preventing said second lever portion from engaging said shift block member at said second point when said resistance to axial movement is less than the axial force required in the second segment of axial movement of said positive clutch member, said resilient means resiliently deflectable to allow said second lever portion to solidly contact said shift block member at said second point when said resistance to axial movement is substantially equal to the axial force required in the second segment of axial movement of said positive clutch member.

* * * * *